United States Patent
Vijayakumar et al.

(10) Patent No.: US 6,766,281 B1
(45) Date of Patent: Jul. 20, 2004

(54) MATCHED TEXTURE FILTER DESIGN FOR RENDERING MULTI-RATE DATA SAMPLES

(75) Inventors: Baskaran Vijayakumar, Mountain View, CA (US); Konstantine I. Iourcha, San Jose, CA (US)

(73) Assignee: S3 Graphics Co., Ltd. (KY)

(*) Notice: Subject to any disclaimer, the term of this patent is extended or adjusted under 35 U.S.C. 154(b) by 0 days.

(21) Appl. No.: 09/855,322

(22) Filed: May 14, 2001

(Under 37 CFR 1.47)

Related U.S. Application Data (60) Provisional application No. 60/204,085, filed on May 12, 2000.

(51) Int. Cl.[7] ................................................. G06T 1/00
(52) U.S. Cl. ........................ 702/190; 345/582; 382/260
(58) Field of Search ................................. 702/189–190, 702/196–197; 345/581–582, 587; 382/260–265, 275, 285

(56) References Cited

U.S. PATENT DOCUMENTS

| | | | |
|---|---|---|---|
| 4,343,037 A * | 8/1982 | Bolton ........................ 345/582 |
| 5,347,618 A | 9/1994 | Akeley | |
| 5,471,568 A | 11/1995 | Webb et al. | |
| 5,511,153 A * | 4/1996 | Azarbayejani et al. ...... 345/419 |
| 5,734,386 A * | 3/1998 | Cosman ........................ 345/587 |
| 5,740,343 A * | 4/1998 | Tarolli et al. ................ 345/587 |
| 5,831,624 A * | 11/1998 | Tarolli et al. ................ 345/587 |
| 6,005,582 A | 12/1999 | Gabriel | |
| 6,016,152 A * | 1/2000 | Dickie ........................ 345/648 |
| 6,064,393 A * | 5/2000 | Lengyel et al. .............. 345/427 |
| 6,128,000 A | 10/2000 | Jouppi et al. | |
| 6,281,903 B1 * | 8/2001 | Martin et al. ................ 345/421 |
| 6,292,193 B1 * | 9/2001 | Perry et al. .................. 345/582 |
| 6,304,286 B1 * | 10/2001 | Shirai et al. .................. 348/51 |
| 6,317,525 B1 | 11/2001 | Aleksic et al. | |
| 6,359,619 B1 * | 3/2002 | Waters et al. ................ 345/426 |
| 6,377,273 B1 | 4/2002 | Lee et al. | |
| 6,400,370 B1 | 6/2002 | Lee et al. | |
| 6,466,206 B1 * | 10/2002 | Deering ........................ 345/419 |
| 6,489,966 B1 | 12/2002 | Kanzaki et al. | |
| 6,509,897 B1 | 1/2003 | Lewis | |
| 6,570,579 B1 | 5/2003 | MacInnis et al. | |

OTHER PUBLICATIONS

"Programming Assignment #5: Beier–Neely Morphing", Nov. 23, 1999, www.cs.rochester.edu/u/www/u/kyros/Courses/CS290B/Assigns/assign5.html.*

Joel McCormack, Ronald Perry, Keith I. Farkas, and Norman P. Jouppi, "Feline: Fast Elliptical Lines for Anisotrapic Texture Mapping", Computer Graphics Proceedings, Annual Conference Series, Aug. 1999, pp. 243–250, Los Angeles, California.

(List continued on next page.)

*Primary Examiner*—Marc S. Hoff
*Assistant Examiner*—Mary Catherine Baran
(74) *Attorney, Agent, or Firm*—Carr & Ferrell LLP

(57) ABSTRACT

A method and apparatus for texture filtering is provide wherein a filter select module is adapted to select a filtering mode based upon a sampling rate of polygon and texture data. The filter mode is selected by determining the filter characteristics of the selected filtering mode based upon the sampling rate and a degree of warping per texture coordinate. A texture reconstruction filter characteristic is morphed based upon the input polygon and texture data so that, after subsamples are aggregated, an effective filter characteristic matches the texture reconstruction filter characteristic of a texture reconstruction filter used for coarse sampling. Subsequently, a texel blending module computes texel blending factors based on the filtering mode determined by the filter select module.

20 Claims, 7 Drawing Sheets

OTHER PUBLICATIONS

Loren Carpenter, "The A–buffer, an Antialiased Hidden Surface Method", Computer Graphics, Jul. 1984, pp. 13–18, vol. 18, No. 3, Association for Computing Machinery, Inc.

Andreas Schilling, "A New Simple and Efficient Antialiasing with Subpixel Masks", Computer Graphics, Jul. 1991, pp. 133–141, vol. 25, No. 4, Universitat Tubingen Bundesrepublik Deutschland.

Jay Torborg, James T. Kajiya, "Talisman: Commodity Real-time 3D Graphics for the PC", Microsoft Corporation.

Norman P. Jouppi, Chun–Fa Chang, "Z3: An Economical Hardware Technique for High–Quality Antialiasing and Transparency", 1999, pp. 85–93, Eurographics Los Angeles California.

Carl Mueller, "Mipmapping", http://www.ping.be/powervr/Anisotropic2.htm.

"Anisotropic Filtering Explained", http://www.ping.be/powervr/Anisotropic.htm.

* cited by examiner

MATCHED TEXTURE FILTER DESIGN FOR RENDERING MULTI-RATE DATA SAMPLES

CROSS-REFERENCES TO RELATED APPLICATIONS

This application claims the benefit of Provisional Patent Application Serial No. 60/204,085, filed on May 12, 2000, entitled "A Matched Texture Filter Design for Rendering Multi-Rate Data Samples." and is related to a commonly-assigned U.S. patent application Ser. No. 09/855,280 filed on May 14, 2001, entitled "Selective Super-Sampling/Adaptive Anti-Aliasing or Complex 3D Data", the subject matter of which is herein incorporated by reference.

BACKGROUND OF THE INVENTION

1. Field of the Invention

The present invention relates generally to graphics systems, and more particularly to texture filtering for 3D graphics with screen pixel digitization at variable sampling rates.

2. Description of the Background Art

A texture is a digital image, typically rectangular in shape, having a (u, v) coordinate space. The smallest addressable unit of a texture is a texel, which is located at a particular coordinate in the (u, v) coordinate system. In a texture mapping operation, a texture is mapped to the surface of a graphical model as the model is rendered to create a destination image. In the destination image, pixels are located at particular coordinates in the (x, y) coordinate system.

In texture mapping, data is sampled from the texture to compute an intensity value for a pixel in the destination image. The sampled texels for a given pixel are typically identified by mapping a point in the destination image into the texture. Texels neighboring the mapped point in the texture are then sampled, weighted, and summed to compute the intensity value for a pixel. The process is then repeated for additional pixels in the destination image.

Various texture reconstruction filtering techniques may be used to reduce blocky appearance and aliasing noise in textures while applying perspective effects to produce a smoother and more realistic destination image. Such texture filtering techniques include box filtering (point sampling or any box filter), bilinear filtering, trilinear filtering, and anisotropic filtering.

Filtering with the box filter (point sampling) technique is the most basic method for texture mapping and determining the attributes, such as color, of a pixel from the texture maps. Point sampling uses the nearest texel value mapped to a particular pixel to determine the pixel attribute. For example, assume that a given pixel location at coordinates (x, y) is mapped to particular texture coordinates (u, v). The texture coordinates (u, v) may include fractional values. However, in point sampling, the texture coordinate assigned to the pixel will be the nearest integer value. Thus, if a given pixel is mapped to texture coordinates (u, v)=(1.2, 1.9), the point sampling technique will assign a texel with texture coordinates (u', v') to the given pixel with the texture coordinates (u', v') being based on the nearest integer value: (u', v')=(1, 2).

Bilinear filtering involves interpolating the attribute values of four surrounding discrete texels to calculate the attribute value of a new texel which is then assigned to a particular pixel. The process is then repeated for each pixel forming the object being textured. The bilinear filtering technique provides reasonably realistic images and improved image quality over the point sampling filtering technique.

Trilinear filtering involves the use of multiple texture maps or MIP maps at various levels of depth. Bilinear filtering is preformed in each MIP map level, resulting in a new texel for each MIP map level. The actual attribute value for a pixel is then determined by performing another interpolation step between the two new texels associated with two particular MIP map levels, resulting in an interpolation process in three dimensions.

Anisotropic filtering involves taking samples of texels in the texture with the samples chosen according to the shape of the pixel "footprint" in the texture space. Thus, the shape of the region of the texels that are sampled varies as circumstances dictate.

These various texture-filtering algorithms do not address the problem of variable sampling rate or other non-standard graphics processes. When sections of a scene are sampled at varying sampling rates, it is desirable to appropriately modify the characteristics of the texture filter. Otherwise, the effective filter characteristics will not be consistent over the entire scene, resulting in undesirable artifacts.

Further, when a scene is super-sampled, a convolution is effectively performed for the post-filter and the texture reconstruction filter. The characteristics of the resulting higher-order filter typically matches the characteristics of a filter used for coarse sampling. Without this matching of filter characteristics, banding will occur in the image due to the additional filtering applied to aggregate dense samples resulting in different passbands in the areas with the different sampling rates.

Additionally, in conventional systems, the texture-filtering model is typically pre-specified in each particular application. Conventional systems do not provide a texture filter that varies the filter characteristics in response to, for example, the rate of sampling and the extent of texture warping. Such deficiencies of conventional systems lead to images that are generated with undesirable artifacts. Therefore, there is a need for a matched texture filter design for varying sample rates.

SUMMARY OF THE INVENTION

The present invention provides in various embodiments a texture filter that takes into account the sampling rate and the non-linear mapping between screen coordinates and texture coordinates. In particular, these embodiments of the present invention provide a matched texture filter that continuously changes the pass band—stop band characteristics based upon the rate of sampling of polygon data and the extent of perspective warping introduced by the non-linear screen-to-texture mapping function. The matched texture filter is capable of changing so that after post-filtering, the resulting filter characteristic effectively matches the characteristics of a filter used for coarse sampling.

In one embodiment of the present invention, an apparatus is provided for texture filtering with characteristics that continuously vary between a bilinear filter and a box filter. The variations may be based upon, for example, the sampling rate of polygon data and the degree of texture warping. The texture filter behaves like a bilinear filter when the sampling rate per pixel is at the same rate as the desired screen resolution. The texture filter may have the characteristic of a combination of a bilinear filter and a box filter when the sampling rate increases per pixel. The characteristics of the matched texture filter can also be dependent upon the amount of "stretching" or "squeezing" of the texture area when polygon data is super-sampled. A texture area is "stretched out" when a small texture area (e.g., one texel)

fills a big screen area. A texture area is "squeezed" when multiple texels are imposed on a small screen area.

In a second embodiment of the present invention, a texture filter is provided that behaves like a trilinear filter when the sampling rate per pixel is at the same rate as the desired screen resolution. The texture filter is a combination of a linear filter (between MIP levels) and a box filter when the sampling rate increases per pixel. As in the first embodiment, the characteristics of the matched texture filter in the second embodiment can also be dependent upon the amount of "stretching" or "squeezing" of the texture area when the polygon data is super-sampled.

In a further embodiment, the variation of the filter characteristics between the various filter modes (e.g., bilinear filter, trilinear filter, point sample filter, etc.) is preferably continuous. By continuously varying texture filters between two and artifacts normally visible during animation are eliminated.

DESCRIPTION OF THE PREFERRED EMBODIMENT

Figure 1:
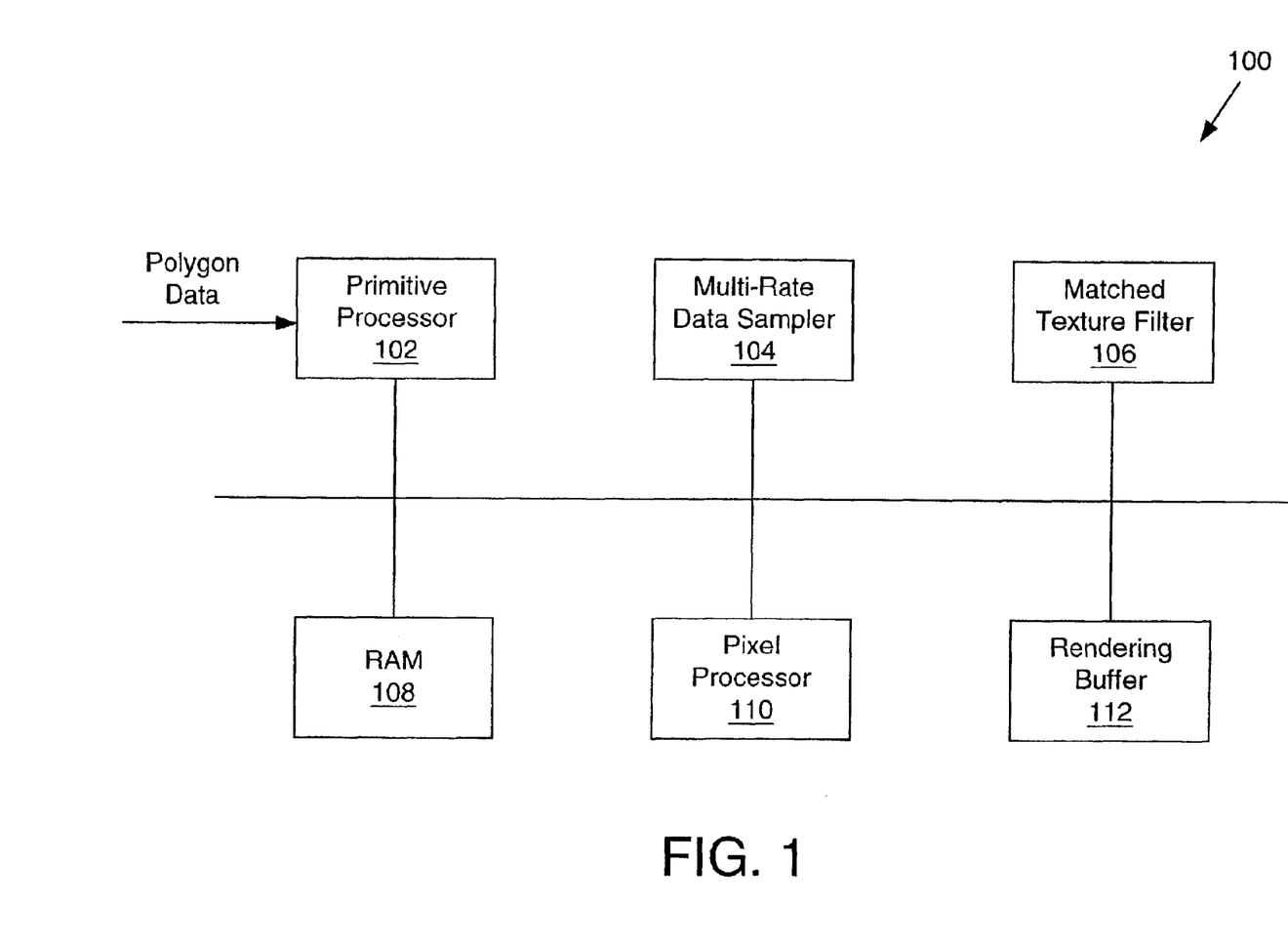
FIG. 1 is a block diagram of a system for performing the texture filtering operations in accordance with an embodiment of the present invention.

FIG. 1 is a block diagram of an exemplary system 100 for performing the texture filtering operations of the present invention. The system 100 is typically implemented in a graphics processing system within a computer or similar processing device. The system 100 includes a primitive processor 102, a multi-rate data sampler 104, a matched texture filter 106, RAM 108 for storing textures, a pixel processor 110 and a rendering buffer 112.

The primitive processor 102, which may be a triangle processor, typically receives the three-dimensional geometry elements (e.g., triangles or other graphic primitives) and processes the data describing the size, shape, position, and other relative characteristics of the graphics primitives. In some cases, the primitive processor 102 is also capable of generating edge functions of the primitives. These primitives may be defined in three-dimensions using Euclidian coordinates or in four-dimensions using homogenous coordinates, and subsequently, projected onto a two-dimensional plane by a known algorithm.

The multi-rate data sampler 104 selects a finite set of values from the polygon data received by the primitive processor 102. The sampling of the polygon data may occur at different resolutions. For example, interior portions of a polygon may be sampled at a rate which is required to generate the destination screen resolution, while the detected edges of a polygon may be super-sampled at a higher resolution.

The matched texture filter 106 performs one of the filtering techniques (e.g., bilinear filtering, trilinear filtering, box filtering, a combination of bilinear and box filtering, and/or a combination of linear filtering between MIP levels) to calculate the color value (or other attribute) of a new texel which is then assigned to a particular pixel. The matched texture filter 106 may generate the filtered textured pixel values based on data received from the RAM 108. In a preferred embodiment, the matched texture filter 106 continuously changes its filter pass band—stop band characteristics based upon the rate of sampling and the extent of perspective warping introduced by the non-linear texture-to-screen mapping function. Additionally, the matched texture filter 106 may be used in various types of applications such as in rendering multi-rate data samples (polygon data sampling at different resolutions).

The pixel processor 110 performs rendering operations. The rendering operations may be altered in a selected manner to generate various effects such as simulated light sources and shadows. Finally, the rendering buffer 112 stores images which may be displayed in a display device or used to render another image.

Figure 2:
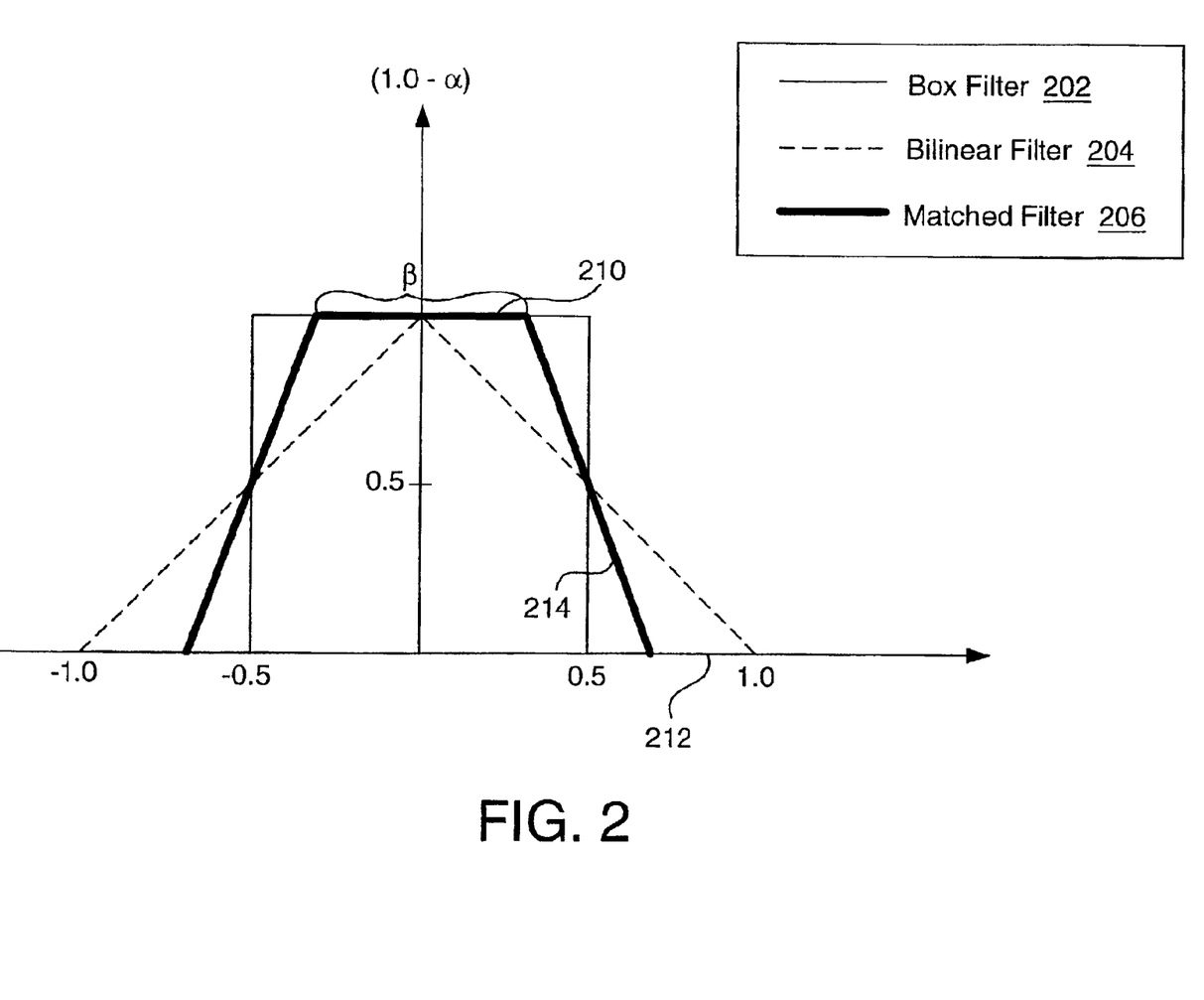
FIG. 2 is a graph illustrating the spatial characteristics of the point sample filter, the bilinear filter and the matched texture filter in accordance with an embodiment of the present invention.

FIG. 2 is a graph illustrating spatial characteristics of a box filter, a bilinear filter, and a matched texture filter. The equation used to compute the coefficients $\beta_u$, $\beta_v$ for each texture coordinates u, v is given by:

$$\beta_u = \min\{\delta_u \cdot (n-1)/n, 1.0\} \quad (1)$$

$$\beta_v = \min\{\delta_v \cdot (n-1)/n, 1.0\} \quad (2)$$

wherein $\beta_u$, $\beta_v$ are coefficients that determine the blending factor $\alpha_u$, $\alpha_v$ (for the u and v texture coordinate directions, respectively) for texture interpolation.

The term n is the (linear) sampling rate of the polygon data. The sampling rate n determines the characteristic of the matched texture filter 106 (FIG. 1). When n=1, polygon data are sampled at a rate which is required to generate the destination screen resolution. For this condition, the matched texture filter 106 behaves as a pre-determined default filter (i.e., the matched texture filter 106 may behave like a bilinear or trilinear filter).

However, when n>1, polygon data are sampled at a finer resolution. For example, polygon edges may be selectively super-sampled at higher resolution values as described in the commonly-assigned U.S. Patent Application entitled "Selective Super-Sampling/Adaptive Anti-Aliasing or Complex 3D Data". The interior of a primitive may be sampled at the resolution which is required during a scan conversion stage, while the primitive edge may be super-sampled at a higher resolution than that required during the scan conversion stage. For this condition, the matched texture filter 106 may be a combination of the predetermined default filter (e.g., bilinear filter) and a low order filter such as a box filter, as illustrated by matched filter graph 206.

Alternatively, the matched texture filter 106, when n>1, may embody characteristics of a linear filter (between MIP levels) and a combination of a bilinear and box filter. Thus, the matched texture filter 106 is capable of morphing between different filters, such as a bilinear filter and a combination bilinear and low order filter. In one embodiment, the matched texture filter morphs in a continuous manner. Since, the matched texture filter 106 behaves with the characteristics of a combination of the predetermined default mode and a point sample filter when n>1, an improved texture image is advantageously generated.

When $\beta_u=0$, $\beta_v=0$, then the matched texture filter 106 behaves as a bilinear filter and will have the characteristics of bilinear filter graph 204. When $\beta_u=1$, $\beta_v=1$ in equations (1) and (2), then the matched texture filter 106 behaves like a box reconstruction filter (effectively point sampling) and will have the characteristics of box filter graph 202. Finally, when $0<\beta_u<1$, $0<\beta_v<1$, the matched texture filter 106 behaves with the characteristics of both a bilinear and point sample filter. Thus, the matched texture filter 106 has characteristics which morph between a bilinear and a box filter. The matching filter graph 206 is an exemplary illustration of the characteristics of the matched texture filter 106 when $0<\beta_u<1$, $0<\beta_v<1$ is satisfied (i.e., n>1 in equations (1) and (2)). As shown in FIG. 2, the matched filter characteristic (see graph 206) is a combination of characteristics of the bilinear filter (see graph 202) and the box filter (see graph 204). As n approaches infinity, the value $\beta$ approaches a value of 1. It should be noted that $\beta_u$, $\beta_v$ in equations (1) and (2) are restricted to values between 0 and 1. This restriction function may be implemented by, for example, software code.

The terms $\delta_u$, $\delta_v$ represent the amount of "stretching" of the texture area (when a small texture area is mapped to a large screen area), or the amount of "squeezing" of a texture area (when a large texture area is mapped to a smaller screen area). Typically, the values of $\delta_u$, $\delta_v$ are obtained, for example, from polygon data per sample. As shown in equations (1) and (2), the values of $\beta_u$, $\beta_v$ are dependent on the values of $\delta_u$, $\delta_v$. Thus, the values of $\delta_u$, $\delta_v$ determine the blending factors $\alpha_u$, $\alpha_v$ for texture interpolation when the polygon data are super-sampled (i.e., when n>1).

A conventional technique may be used to determine the amount of stretching. Assuming the texture mapping is defined by the (inverse) functions $$u = U(x, y) \quad (3)$$
$$v = V(x, y) \quad (4)$$

where U and V are usually some projective (first order rational) functions computed during the primitive setup. A Jacobian is computed as follows:

$$J = \begin{pmatrix} \frac{\partial U(x,y)}{\partial x} & \frac{\partial V(x,y)}{\partial x} \\ \frac{\partial U(x,y)}{\partial y} & \frac{\partial V(x,y)}{\partial y} \end{pmatrix} \quad (5)$$

and then, $$d_u = J^{-1}\begin{pmatrix} 1 \\ 0 \end{pmatrix}, \; d_v = J^{-1}\begin{pmatrix} 0 \\ 1 \end{pmatrix} \quad (6)$$

Thus, we calculate the $\delta_u$, $\delta_v$ as:

$$\delta_u = \min\left\{\frac{1}{|d_u|}, 1\right\}, \; \delta_v = \min\left\{\frac{1}{|d_v|}, 1\right\} \quad (7)$$

An example for determining the texel blending factors $\alpha_u$ is given below. FIG. 2 shows the graph for the term $(1-\alpha)$ as a function of ufraction or vfraction. Given the fractional part (ufraction) of the texture coordinate u, the texel blending factor $\alpha_u$ is computed as follows (note that the algorithm may take on a slightly different form dependent on whether D takes on a full- or half-width value as shown in FIG. 2).

$u\text{Fraction} = u - \text{floor}(u)$,

If $(u\text{Fraction} \leq \beta_u/2)$ $\alpha_u = 0.0$ else if $(u\text{Fraction} > (1.0 - \beta_u/2))$ $\alpha_u = 1.0$ else $\alpha_u = (u\text{Fraction} - \beta_u/2)/(1.0 - \beta_u)$ When $\alpha_u=0$, the value of $(1-\alpha_u)$ is represented by segment 210 with respect to the u texture coordinate direction. When $\alpha_u=1$, the value of $(1-\alpha_u)$ is represented by segment 212 with respect to the u texture coordinate direction. When $\alpha_u=(\text{ufraction}-\beta/2)/(1-\beta)$, the value of $(1-\alpha_u)$ is represented by segment 214 with respect to the u texture coordinate direction.

$v\text{Fraction} = v - \text{floor}(v)$,

If $(v\text{Fraction} \leq \beta_v/2)$ $\alpha_v = 0.0$ else if $(v\text{Fraction} > (1.0 - \beta_v/2))$ $\alpha_v = 1.0$ else $\alpha_v = (v\text{Fraction} - \beta_v/2)/(1.0 - \beta_v)$.

Figure 3:
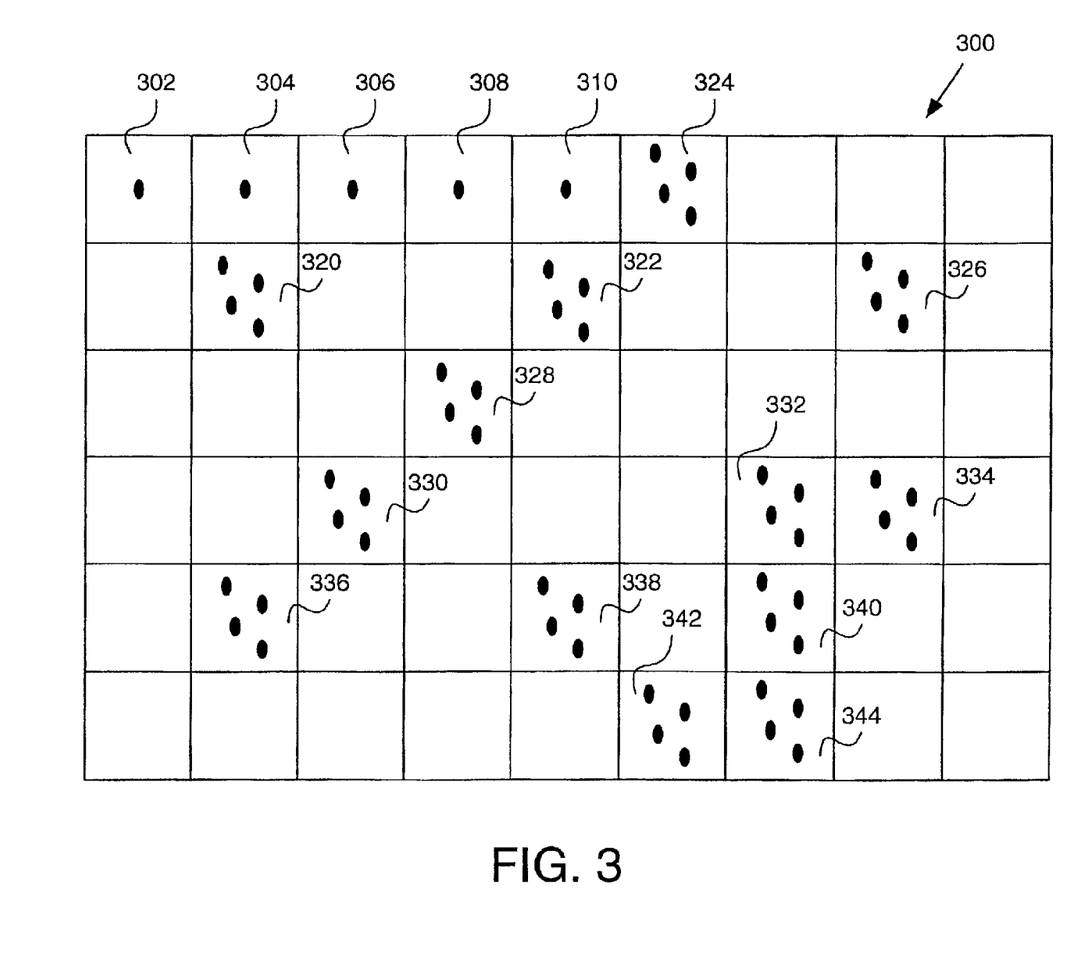
FIG. 3 is a diagram illustrating an example of multi-rate polygon data sampling.

FIG. 3 is a diagram 300 illustrating an example of multi-rate polygon data sampling. As shown in FIG. 3, if polygon data 302, 304, 306, 308 and 310 are each sampled at a rate required to generate the destination screen resolution, then n=1 and the matched texture filter 106 (FIG. 1) behaves as a pre-determined default filter. However, if polygon data 320–344 are each super-sampled at a finer resolution, then n>1 and the matched texture filter 106 is a combination of the pre-determined default filter and a low order filter.

Figure 4:
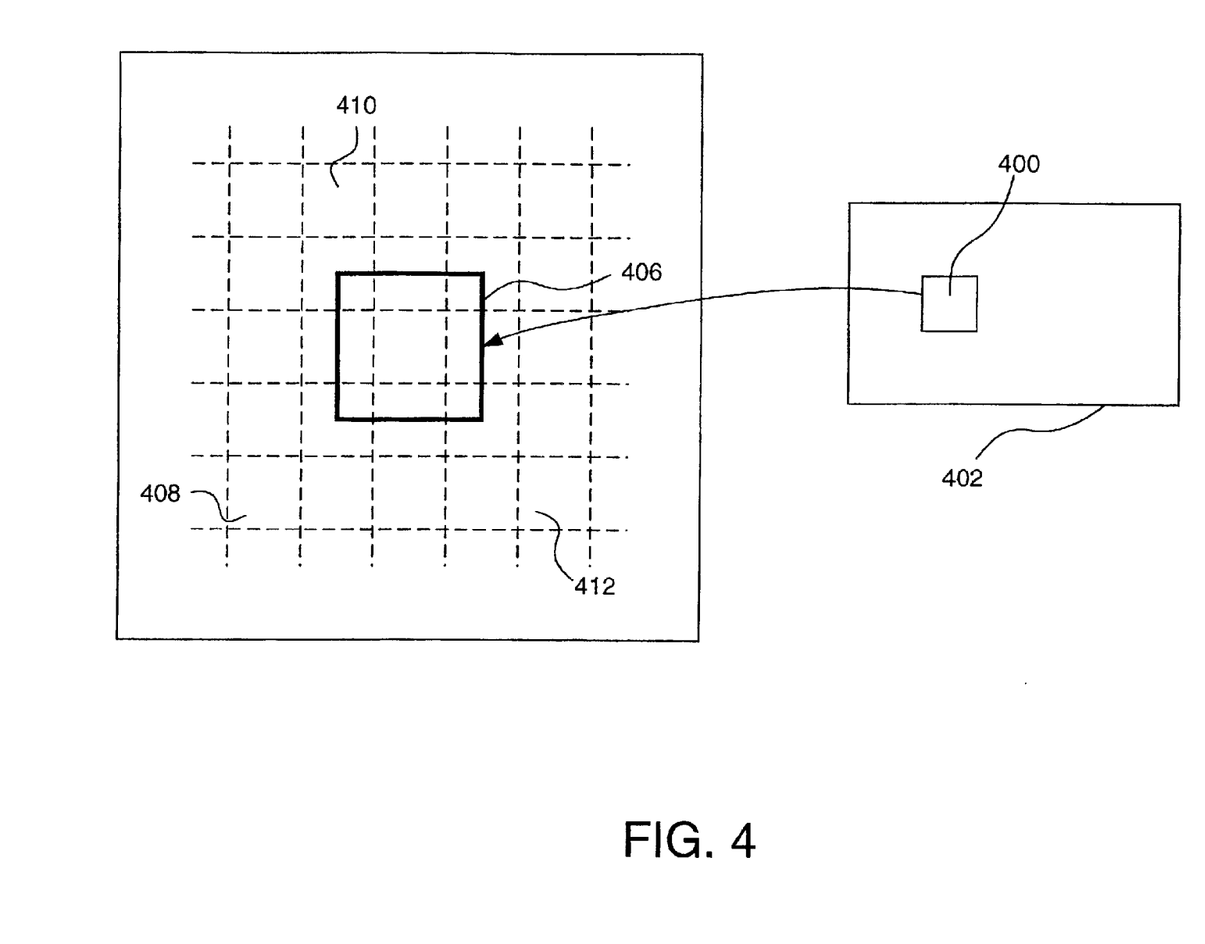
FIG. 4 is a diagram illustrating an example of a texel mapped to a large screen area.

FIG. 4 is an exemplary diagram illustrating the mapping of a small textual area (texel 400) to a large screen area 406. As shown, the small texture area (texel) 400 of texture 402 is mapped to the larger sized screen area 406 having a size greater than one pixel (such as pixels 408, 410 and 412). This mapping results in the stretching of the texel 400.

Figure 5:
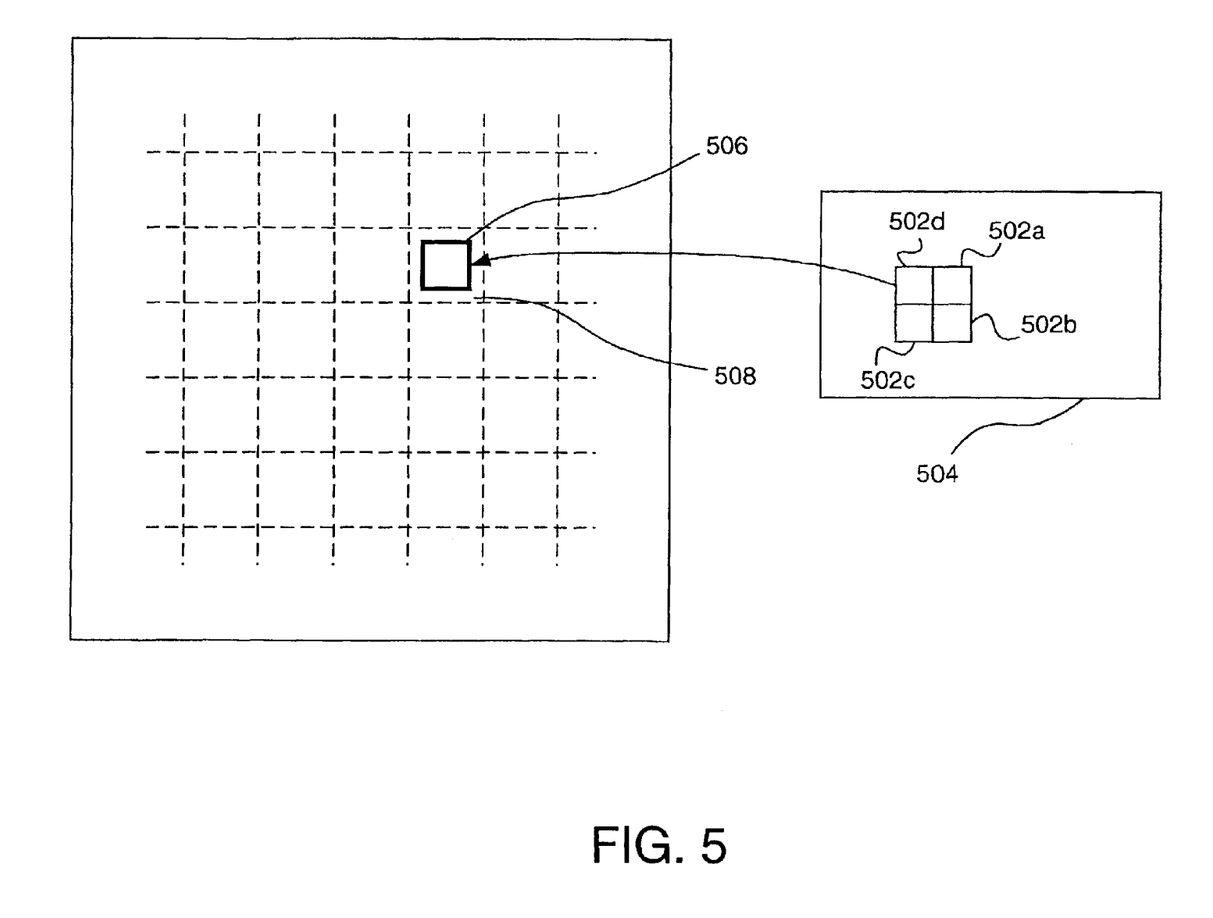
FIG. 5 is a diagram illustrating an example of multiple texels mapped to a smaller screen area.

FIG. 5 is an exemplary diagram illustrating the mapping of multiple texels 502*a–d* of a texture 504 to a smaller screen area 506 having a size less than one pixel 508. This mapping results in the squeezing of the multiple texels 502*a–d*.

It should be noted that when super-sampling of polygon data is not performed (i.e., n=1), $\beta_u$, $\beta_v$ will have values of zero in equations (1) and (2), and the matched texture filter 106 (FIG. 1) will operate in the predetermined default mode (e.g., bilinear or trilinear filtering). Alternatively, when super-sampling of polygon data is performed (i.e., n>1), the amount of texture "stretching" or "squeezing", as represented in the $\delta_u$, $\delta_v$ values of equations (1) and (2) will partly determine the $\beta_u$, $\beta_v$ values. The $\beta_u$, $\beta_v$ values, in turn, determine the filter characteristics of the matched texture filter 106.

The matched texture filter 106 (FIG. 1) of the present invention is capable of preventing the appearance of primitive edges on an image in the case of selective edge supersampling, as described in commonly-assigned U.S. Patent Application entitled "Selective Super-Sampling/

Figure 6:
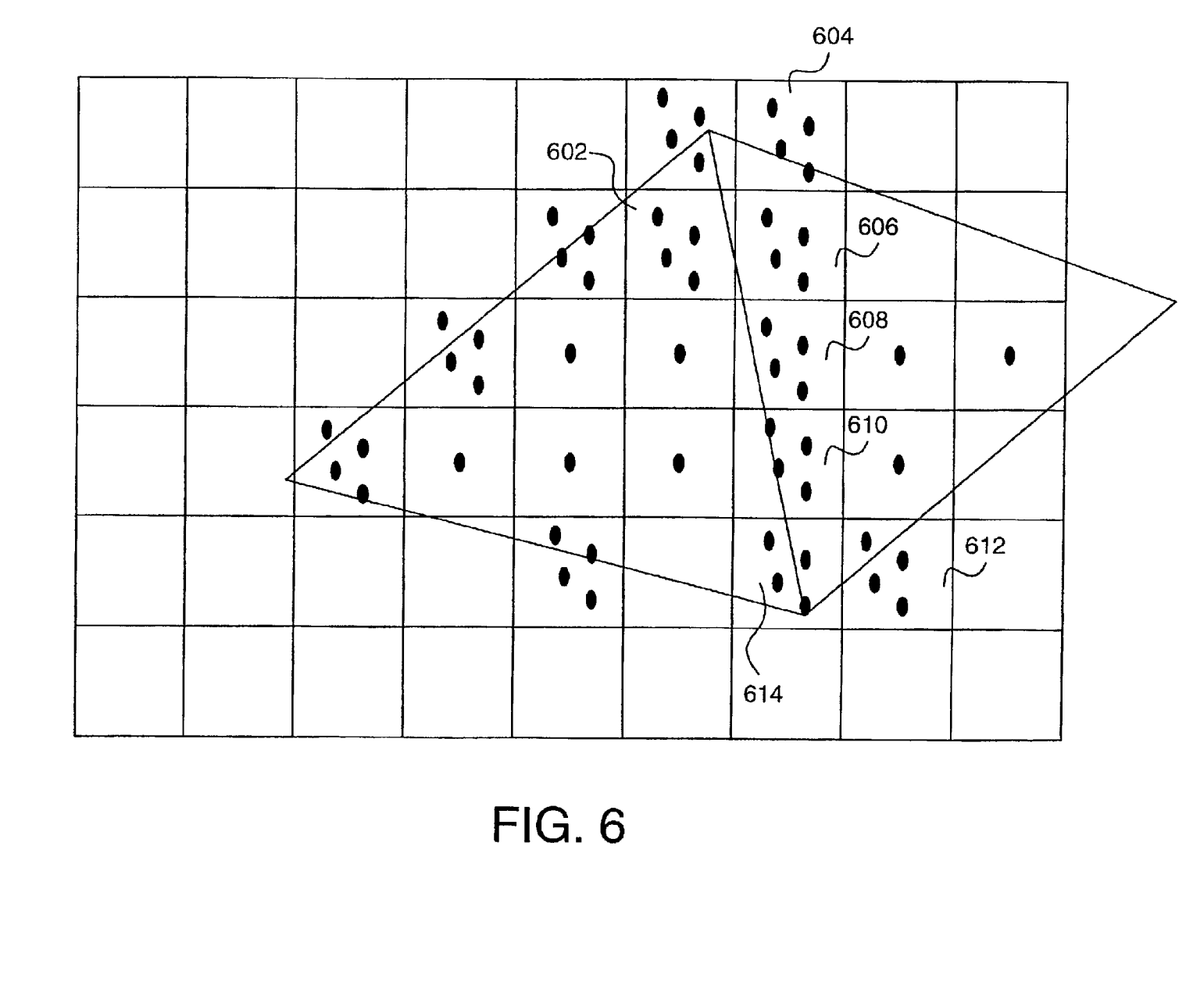
FIG. 6 is a block diagram illustrating an internal edge problem.

Adaptive Anti-Aliasing or Complex 3D Data". For example, FIG. 6 illustrates a typical problem with internal edges. Assuming that the prescribed default mode for the matched texture filter 106 (FIG. 1) is the bilinear filtering mode and that super-sampling is performed at areas covered by pixels 602, 604, 606, 608, 610, 612 and 614, the filtering technique used at pixels 602–614 and the averaging of the subsamples (post-filtering) step for those same pixels should have a response equivalent to the default mode (i.e., bilinear filtering mode). Otherwise, a primitive edge 616 may appear as shown in FIG. 6.

Another feature in accordance with an embodiment of the present invention relates to performing matched texture filtering with a combination of linear filtering (between MIP levels) and box filtering. This embodiment provides a texture filter that behaves like a trilinear filter when, for example, the sampling rate per pixel is at the same rate as the desired screen resolution. The matched texture filter in this embodiment is capable of morphing between a bilinear filter for each MIP map level and a box and trilinear filter when the sampling rate increases per pixel (i.e., when polygon data is super-sampled). The filter characteristic is also dependent on the amount of "stretching" and "squeezing" of the texture when polygon data is super-sampled, as described above with reference to FIG. 2.

Figure 7:
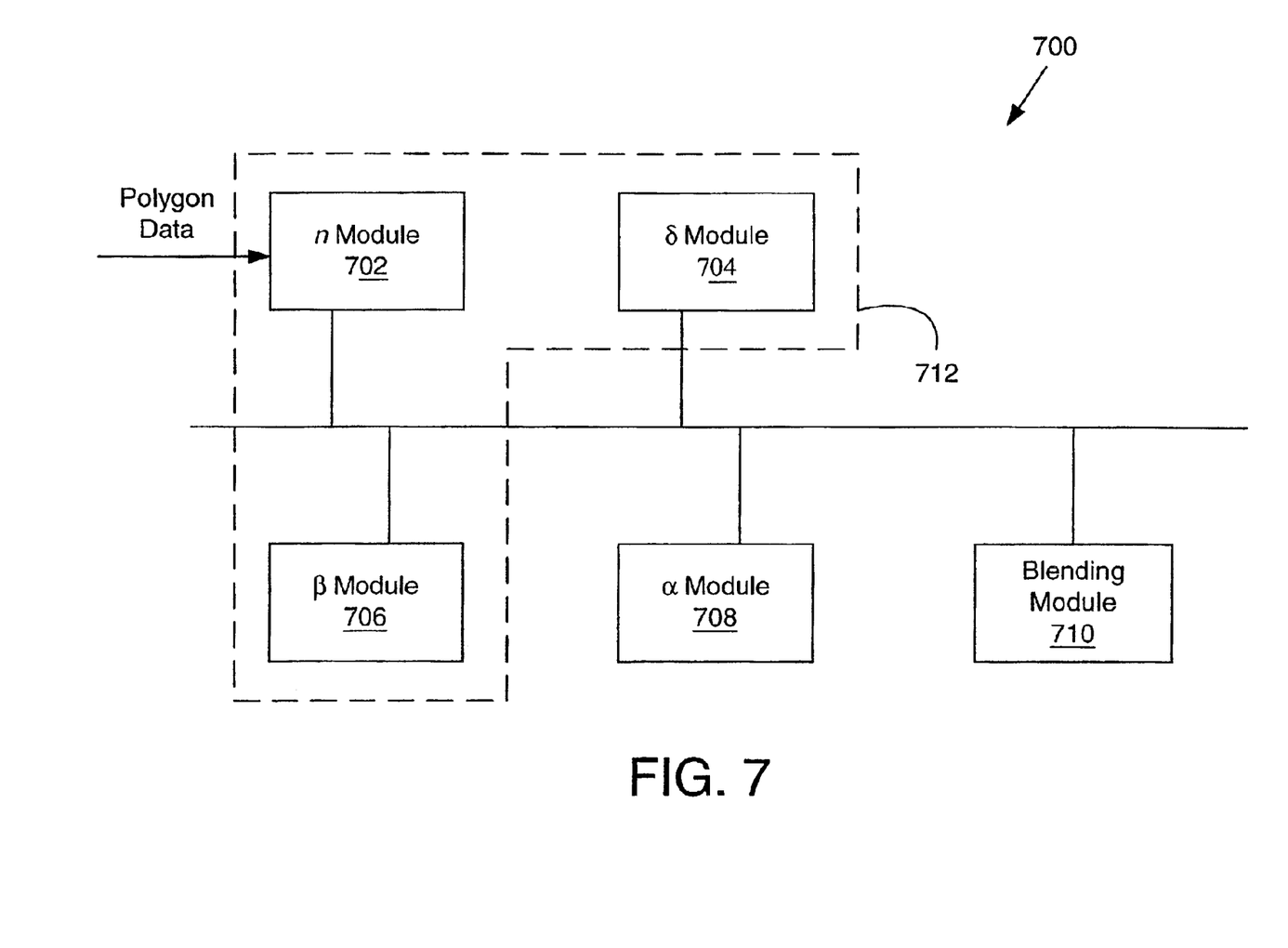
FIG. 7 is a block diagram illustrating the details of the matched texture filter in accordance with an embodiment of the present invention.

FIG. 7 illustrates the details of a matched texture filter 700 in accordance with an embodiment of the present invention. The filter 700 includes an n module 702, a $\delta$ module 704, a $\beta$ module 706, an $\alpha$ module 708 and a blending module 710. The n module 702 determines or detects the sampling rate n for polygon data. Although the present invention describes having the n module 702 in the matched texture filter 700, alternatively, the n filter 702 may be implemented in the multi-rate data sampler 104 (FIG. 1).

The $\delta$ module 704 determines the degree of warping $\delta$ per texture coordinate. Alternatively, the degree of texture coordinate warping $\delta$ may be known or predetermined, which would result in the non-implementation of the $\delta$ module 704.

The $\beta$ module 706 calculates the coefficient $\beta$ which determines the filter shape of the matched texture filter 700. In one embodiment, the value of $\beta$ depends on the sampling rate n and the degree of warping $\delta$ per texture coordinate. For example, $\beta_u$, $\beta_v$ can be calculated based on equations (1) and (2). Although FIG. 7 depicts the n, $\delta$, and $\beta$ modules separately, the n, $\delta$, and $\beta$ modules may be embodied in a single filter select module (shown within dotted line 712).

The $\alpha$ module 708 calculates the texel blending factors $\alpha_u$, $\alpha_v$ based upon the values of $_{62\ u}$, $\beta_v$ in order to generate filtered texture pixel values. Further, blending module 510 performs the blending operations for the filtered texture pixel values by using blending equations. One such blending equation is:

$$C = T[floor(u), floor(v)] \cdot (1 - \alpha_u) \cdot (1 - \alpha_v) +$$
$$T[floor(u) + 1, floor(v)] \cdot \alpha_u (1 - \alpha_v) +$$
$$T[floor(u), floor(v) + 1] \cdot (1 - \alpha_u) \cdot \alpha_v +$$
$$T[floor(u) + 1, floor(v) + 1] \cdot \alpha_u \cdot \alpha_v$$

The parameter T[u, v] is the texture channel value (RGB for instance) for the point [u, v], and floor(x) is defined as the biggest integer which is less than or equal to x; and $\alpha_u$ and $\alpha_v$ are defined as described above. C is the resulting sample value for the interpolated channel.

The C equation above illustrates channel calculation for a single texture level. In the case of MIP maps and trilinear filtering default mode, the above C equation should be done for each of two appropriate MIP levels and the two results should be blended in a conventional way.

The variation of the filter shape is preferably continuous. By making the texture filter vary continuously, artifacts normally visible during animation are not generated.

Thus, the present invention provides in various embodiments a texture filter that takes into account the sampling rate and the non-linear mapping between screen coordinates and texture coordinates. In particular, these embodiments of the present invention provide a matched texture filter that continuously changes the pass band—stop band characteristics based upon the rate of sampling of polygon data and the extent of perspective warping introduced by the non-linear screen-to-texture mapping function.

It is also within the scope of the present invention to implement a program or code that can be stored in an electronically-readable medium to permit a computer to perform any of the methods described herein.

The invention has been described above with reference to specific embodiments. It will be apparent to those skilled in that art that various modifications may be made and other embodiments can be used without departing from the broader scope of the invention. Therefore, these and other variations upon the specific embodiments are intended to be covered by the present invention, which is limited only by the appended claims.

What is claimed is:

1. A method of texture filtering, comprising:
   receiving input information relating to polygon and texture data, where the input information relates to a rate of sampling of the polygon data; and
   morphing a texture reconstruction filter characteristic based upon the input information so that after subsamlples are aggregated, an effective filter characteristic matches the texture reconstruction filter characteristic of a texture reconstruction filter used for coarse sampling.

2. The method of claim 1 wherein the input information relates to a degree of warping per texture coordinate.

3. The method of claim 1 wherein the effective filter characteristic matches the characteristic of a bilinear filter.

4. The method of claim 1 wherein the effective filter characteristic matches the characteristic of a combination of a bilinear filter and a box filter.

5. The method of claim 1 wherein the effective filter characteristic matches the characteristic of a combination of a linear filter between MIP levels and a combination of a bilinear filter and a box filter.

6. The method of claim 1 wherein the morphing of the texture reconstruction filter characteristic is performed in a continuous manner.

7. The method of claim 1 wherein the morphing of the texture reconstruction filter characteristic is determined by a value $\beta$=min ($\delta$*(n−1)/n, 1.0) wherein $\delta$ is a degree of warping per texture coordinate and n is a sampling rate of the polygon data.

8. An electronically-readable medium having embodied thereon a program, the program being executable by a machine to perform a method for texture filtering, the method comprising: receiving input information relating to polygon data and texture data, where the input information relates to a rate of sampling of the polygon data; and
   morphing a texture reconstruction filter characteristic based upon the input information so that after subsamples are aggregated, an effective filter characteristic matches the texture reconstruction filter characteristic of a texture reconstruction filter used for coarse sampling.

9. The electronically-readable medium of claim 8 wherein the input information relates to a degree of warping per texture coordinate.

10. The electronically-readable medium of claim 8 wherein the morphing of the texture reconstruction filter characteristic is performed in a continuous manner.

11. An apparatus for texture filtering, comprising:
   a first module adapted to detect a sampling rate n of polygon data,
   a second module coupled to the first module adapted to select a filtering mode based upon a sampling rate n of polygon data and a degree of warping δ per texture coordinate; and
   a third module coupled to the second module adapted to compute texel blending factors based on the filtering mode determined by the second module.

12. The apparatus of claim 11 wherein the second module selects a filtering mode based upon a value $\beta=\min(\delta*(n-1)/n, 1.0)$.

13. The apparatus of claim 11 further comprising a fourth module coupled to the third module adapted to detect a degree of warping δ per texture coordinate.

14. An apparatus for texture filtering comprising:
   a filter select module adapted to select a filtering mode based upon a sampling rate n of polygon data; and
   a texel blending module coupled to the filter select module adapted to compute texel blending factors based on the filtering mode determined by the filter select module.

15. The apparatus of claim 14 wherein the filter select module determines a filter characteristic of a selected filtering module based upon the sampling rate n and a degree of warping δ per texture coordinate.

16. The apparatus of claim 14 wherein the filter select module selects the filtering mode based upon a value $\beta=\min(\delta*(n-1)/n, 1.0)$.

17. An apparatus for texture filtering, comprising:
   means for receiving input information relating to polygon data and texture data, where the input information relates to a rate of sampling of the polygon data; and
   means for morphing a texture reconstruction filter characteristic based upon the input information so that after subsamples are aggregated, an effective filter characteristic matches the texture reconstruction filter characteristic of a texture reconstruction filter used for coarse sampling.

18. The apparatus of claim 17 wherein the input information relates to a degree of warping per texture coordinate.

19. The apparatus of claim 17 wherein the morphing of the texture reconstruction filter characteristic is performed in a continuous manner.

20. A method of texture filtering, comprising:
   receiving input information relating to polygon and texture data, where the input information relates to a degree of warping per texture coordinate; and
   morphing a texture reconstruction filter characteristic based upon the input information so that after subsamples are aggregated, an effective filter characteristic matches the texture reconstruction filter characteristic of a texture reconstruction filter used for coarse sampling.

* * * * *